(No Model.)
J. MOORE.
DRINKING TROUGH FOR ANIMALS.
No. 321,626. Patented July 7, 1885.
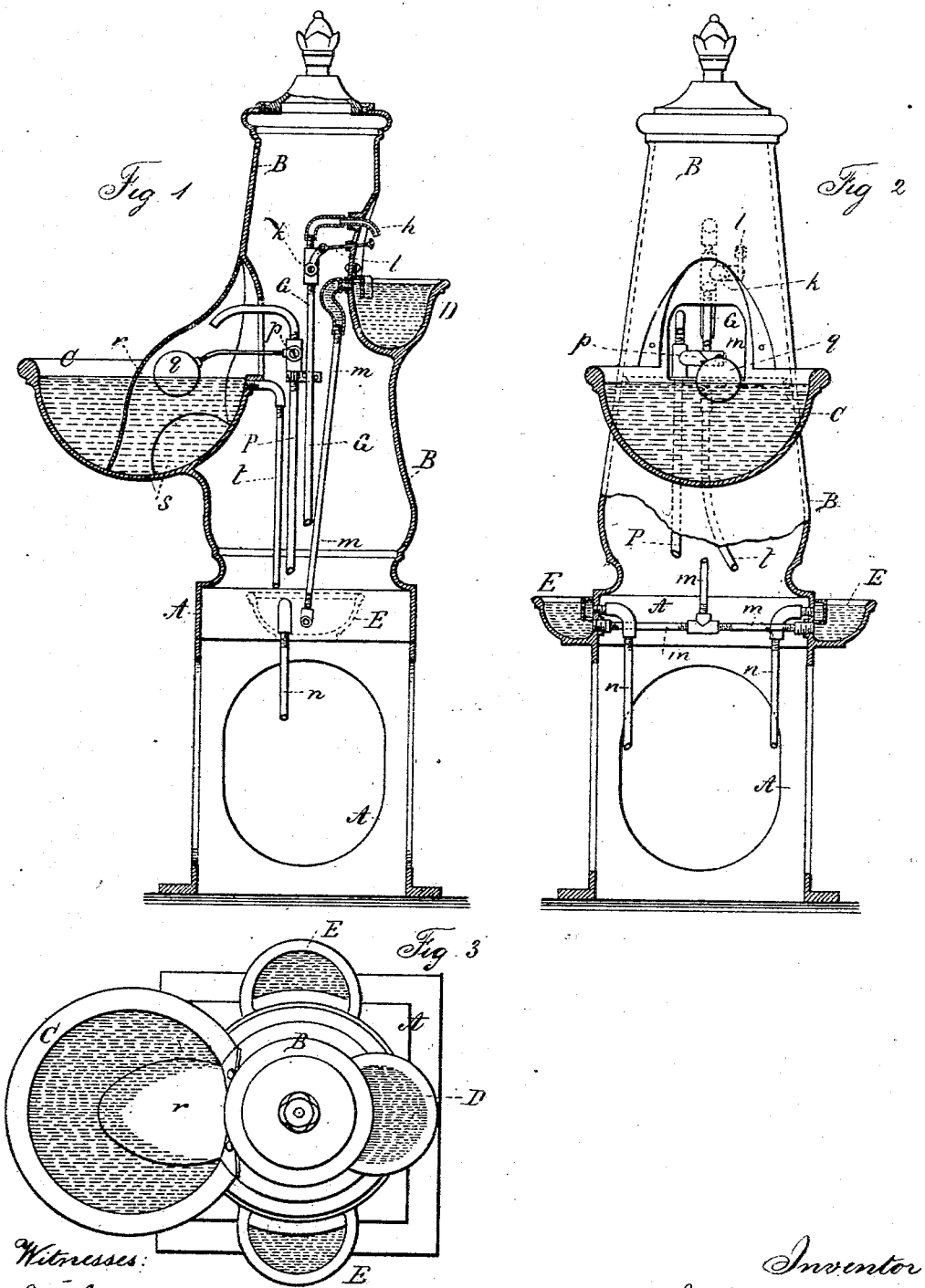

UNITED STATES PATENT OFFICE.

JONATHAN MOORE, OF BROOKLYN, NEW YORK.

DRINKING-TROUGH FOR ANIMALS.

SPECIFICATION forming part of Letters Patent No. 321,626, dated July 7, 1885.

Application filed December 10, 1884. (No model.)

*To all whom it may concern:*

Be it known that I, JONATHAN MOORE, of Brooklyn, in the county of Kings and State of New York, have invented an Improvement in Drinking-Troughs for Animals, of which the following is a specification.

Drinking-fountains have been made in which the water flows continuously into an upper basin adapted to the use of human beings, and from that it flows into other basins at lower levels, for horses, dogs, &c. In these drinking-fountains there is a constant loss of water by the overflow.

The object of my present invention is to provide a clean and wholesome supply of water without waste, and to economize the drippings and other surplus water so as to feed the different basins.

In the drawings, Figure 1 is a vertical section of the drinking fountains or troughs. Fig. 2 is a sectional view at right angles to Fig. 1, and Fig. 3 is a plan view.

The base A and hollow standard or column B are preferably cast together, and they may be more or less ornamental in their character. The horse-trough C is at one side of the standard B, and the smaller basin D is at the other side of such standard at a height convenient for men or women. The basins E are lower down at the sides of the base A. Water is supplied by the pipe G, and there is a bib, $h$, over the basin D, and a cock, $k$, and handle $l$, for allowing water to run from the bib $h$. The basin D will catch all the surplus water that is allowed to run from the bib $h$ in washing off the drinking-cup that is supplied for the use of human beings, and the surplus from this basin D overflows by the pipe $m$ and runs down into the basins E, and in practice it is found that this supply is always sufficient for dogs and other small animals using the basins E; and $n$ is the overflow-pipe to take away surplus water from the basins E. Usually, the water is allowed to run constantly from a bib, such as at $h$, and also from a pipe, P, supplying the horse trough or basin C. I prevent the waste of water at $h$ by the cock $k$, as aforesaid, and I supply water to the basin C by a cock, $p$, and ball or float $q$, so that the water is maintained at the proper level by the ball-cock. These parts alone cannot be used, because the horses would bend the lever of the ball-cock and get the parts out of order. To prevent this I make use of a shield, $r$, extending out from the side of the hollow standard B and passing down into the basin C, as shown. There are openings at $s$ between the shield and the inner surface of the basin, so that the water discharged from the ball-cock can pass out into the outer part of the basin.

If desired, an overflow-pipe, $t$, can be used with the basin C, but usually it is not required, and in many places it is prohibited on account of the loss of water.

I do not claim a trough with a float and cock within a cover or shield; neither do I claim a basin at one side of a hollow standard and a pipe and cock to supply water.

I claim as my invention—

The hollow base and standard and a basin or trough at one side of the same, in combination with the shield $r$, extending down from the standard to near the bottom of the basin, the water-supply pipe and cock located in the hollow standard, and an arm and float to the cock, the float being within the basin but protected by the shield, substantially as set forth.

Signed by me this 3d day of December, A. D. 1884.

JONN. MOORE.

Witnesses:
ALFD. MOSFORD,
C. A. PECK.